Feb. 6, 1951 T. W. HOPKINSON 2,540,115

PULSE DURATION SELECTOR

Filed Nov. 29, 1945 2 Sheets-Sheet 1

Inventor
THOMAS W. HOPKINSON

By M. O. Hayes

Attorney

Feb. 6, 1951 T. W. HOPKINSON 2,540,115

PULSE DURATION SELECTOR

Filed Nov. 29, 1945 2 Sheets-Sheet 2

Inventor
THOMAS W. HOPKINSON

By M. A. Hayes

Attorney

Patented Feb. 6, 1951 2,540,115

UNITED STATES PATENT OFFICE 2,540,115

PULSE DURATION SELECTOR

Thomas W. Hopkinson, Alexandria, Va.

Application November 29, 1945, Serial No. 631,760

5 Claims. (Cl. 175—320)

(Granted under the act of March 3, 1883, as amended April 30, 1928; 370 O. G. 757)

This invention relates to an electric signal or pulse duration selector, and more particularly to an electronic circuit that will control an operating signal to any device, to be controlled upon reception of a signal or pulse whose time duration falls within definite specified limits. The invention is particularly applicable to radio homing beacon control equipment.

It is sometimes desirable to select a pulse signal of a definite time duration and reject all others which do not meet the allowable tolerance. The unique pulse selected may be used indirectly to operate other circuits. These selected pulses or signals may be counted in this fashion by another circuit. Several signal or pulse duration selectors, each designed for a different pulse width acceptance, may be connected in parallel and be made to separate and utilize a desired pulse from a mixture of different width pulses in a common input signal, providing unlike pulses do not occur simultaneously. The tolerance limits of the invention, for the time duration of the pulse it will accept, can be made very small or very large and maintained at these tolerances very accurately. The invention could therefore find wide application in any equipment requiring signal or pulse duration selection.

An object of this invention is to provide means for the acceptance of a signal or pulse whose time duration lies within a specified limit, rejecting all others, and to produce a useful control voltage each time a pulse or signal of the specified time duration appears at the input.

A further object is to accomplish the aims of the preceding object by use of parts which require a minimum of adjustment.

Another object is to provide means which will hold the pulse width tolerance to very close limits so as to make the circuit utilizing the invention highly dependable.

Figure 1:
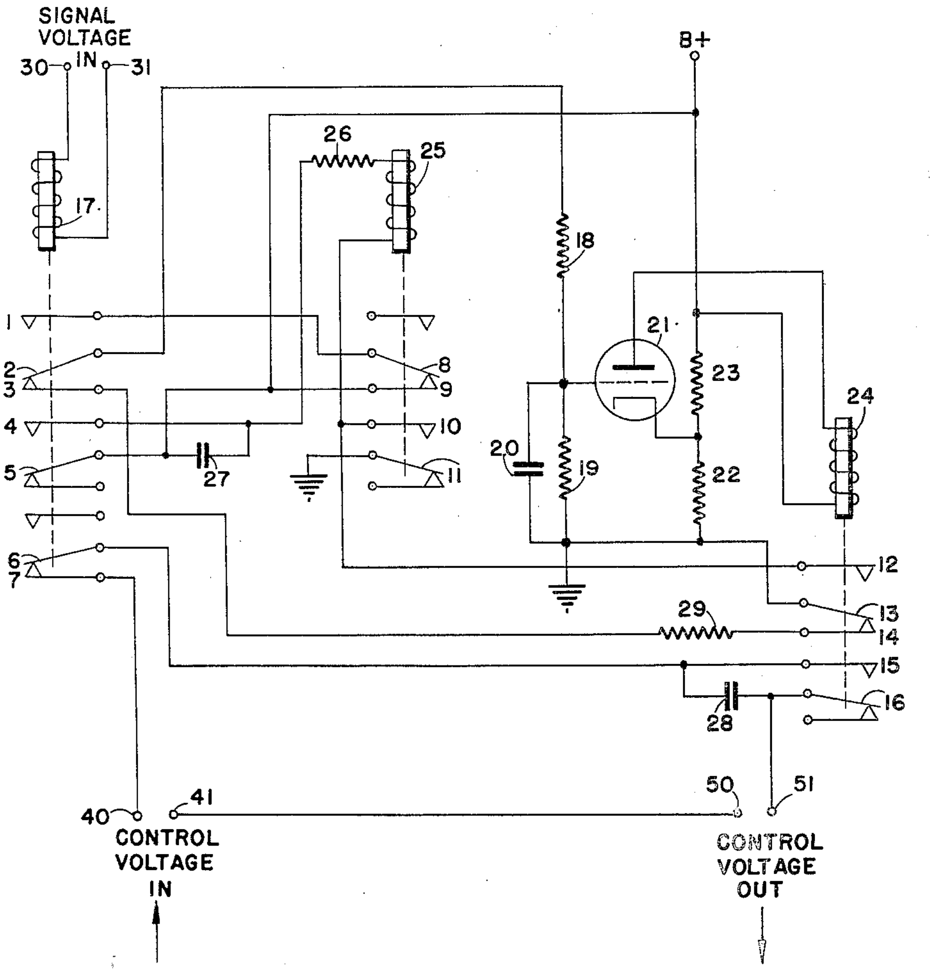
Figure 2:
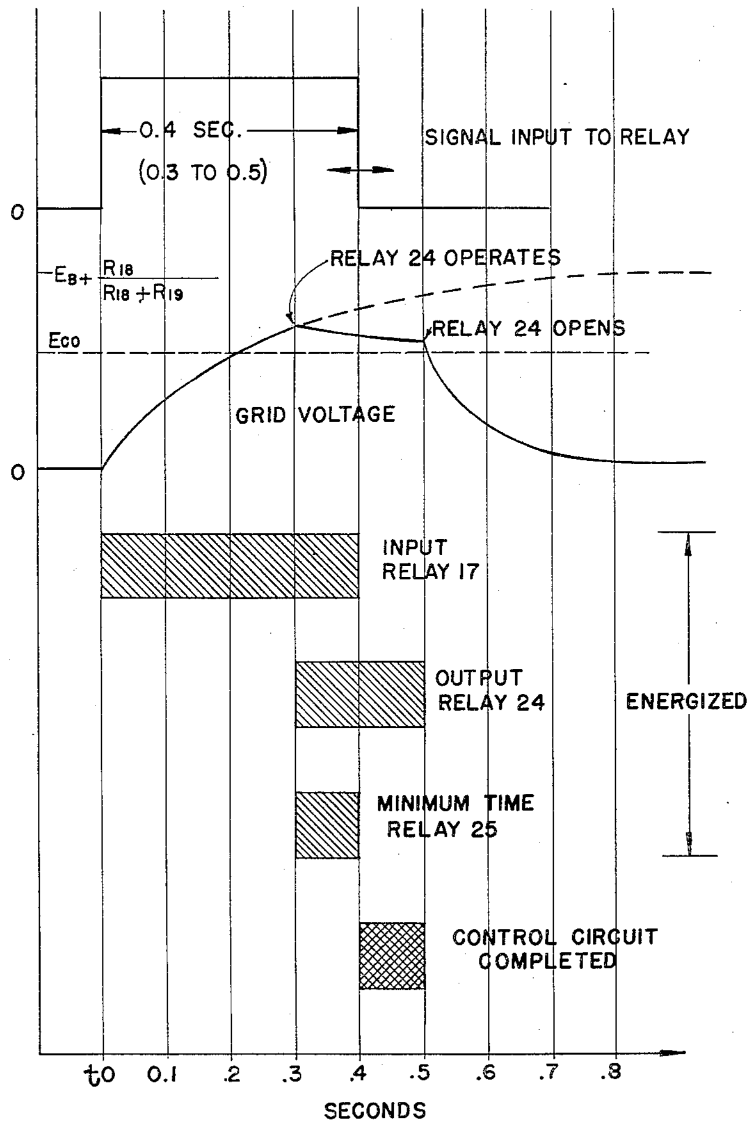

Still other objects and advantages will become evident from a description of a preferred embodiment of the invention made in connection with the accompanying drawings, in which:

Fig. 1 is a wiring diagram illustrating the application of the invention to a signal or pulse duration selector, and Fig. 2 is a graph showing the time relation of the input signal, the grid voltage on the tube, and the relay action.

Referring now to Fig. 1 in detail, the input relay 17 shown is energized by the input signal or pulse applied at terminals 30 and 31. (The term "energized" when used in the specification or claims in describing the relay circuit refers to the condition where sufficient current is passing through the relay to actuate it so that a given pair of contacts are moved from the quiescent open or closed condition respectively to a closed or open condition.) Grid charging resistor 18 and grid resistor 19 are connected as a voltage divider between B+ and ground through contacts 1 and 2 of the input relay 17, and contacts 8 and 9 of the minimum time relay. The charging condenser 20 is connected from the control grid of the vacuum tube 21 to ground. The tube 21 may be any multi-element vacuum tube comprising at least a control grid, an anode, and a cathode, and in the form illustrated it has been represented as a triode. The cathode potential is established by means of cathode resistor 22 and cathode dropping resistor 23 which form a voltage dividing network from B+ to ground. The output relay 24 is connected in series with the plate and B+. Relay 25 is a minimum time relay which is connected to the B+ supply voltage through a current limiting resistor 26 and through contacts 4 and 5 of the input relay 17. It receives its ground return through either contacts 10 and 11 of its own relay or contacts 12 and 13 of the output relay 24. Condensers 27 and 28 are connected across the contacts 4 and 5, and 15 and 16, respectively, to protect these contacts from damage by arcing. The arc suppressor resistor 29 is connected between contacts 3 and 14 and prevents an arc from developing across contacts 2 and 3 when they are opened.

A better understanding of the operation of the circuit of Fig. 1 may be had by tracing an imaginary signal through the circuit. Thus, a signal applied at terminals 30 and 31 energizes the input relay 17 thereby closing contacts 1 and 2 and allowing the B+ voltage to be placed across the voltage divider resistors 18 and 19. The cathode of the tube 21 is connected initially to some positive voltage determined by the values of resistors 22 and 23 and sufficiently high to cut the tube off. However, due to the closing of contacts 1 and 2 by energization of relay 17 condenser 20 now begins to charge up (see Fig. 2) from ground potential to a value which is determined by the supply voltage and the ratio of resistors 18 and 19. At some later time, determined by the RC time-constant of the network formed of condenser 20 and resistors 18 and 19, the grid of tube 21 will rise above cutoff and plate current will flow through tube 21. The grid will continue to rise and the plate current will increase until the output relay 24 passes sufficient current to become energized. When this occurs, contacts 12 and 13 are made thereby allowing the minimum time relay 25 to become energized to effect opening of contacts 8 and 9 and removing the B+ potential from the charging circuit. When this happens, condenser 20 will begin to discharge slowly through the high resistance grid resistor 19. The voltage on the grid then will begin to drop and the plate current will diminish to the point where the output relay 24 will be deenergized. It should be noted that as soon as the output relay 24 is energized, turning on the minimum time relay 25, contacts 10 and 11 are made giving this relay 25 its own ground and making it "self-sealing" as long as the input relay 17 is energized. Furthermore, if a control voltage is applied at terminals 40 and 41 as shown in Fig. 1, it will only reach the output terminals 50 and 51 by passing through contacts 6 and 7, and 15 and 16.

The operation just described can be clearly summarized by referring to the diagrams of Fig. 2. Assume first that the limits have been set so as to accept a pulse between 0.3 second and up to but not including 0.5 second. From the foregoing description it is seen that the input relay 17 is energized for the entire duration of the input signal. The output relay 24 is preset to always energize exactly 0.3 second after relay 17 is energized and remains energized for exactly 0.2 second. Since the operating circuit for the control voltage is completed whenever relay 24 is energized and relay 17 de-energized, coincidence for the specific example chosen occurs from 0.4 second to 0.5 second after the beginning of the initial pulse.

Relay 24 always will be energized for a period of time equivalent to the total tolerance and always will become energized at the beginning of the minimum tolerance value. Hence, it must always become de-energized at the maximum tolerance value.

Using the same tolerance limit, if now we consider a signal of 0.6 second, it can be seen by referring to Fig. 2 that input relay 17 will be energized the entire time that output relay 24 is energized, since last said relay will always energize at minimum tolerance time and for the duration of the total tolerance time. Thus, the output control circuit will never be completed.

Similarly, the same result will be obtained for a signal less than 0.3 second. In this instance, the input relay 17 will de-energize before the output relay 24 can be energized thus stopping the action and again failing to complete the output control circuit.

It is to be understood that the relays herein described may be of the electromagnetic type as shown, or of any other relay type suitable for the purposes described.

In accordance with foregoing description it will be seen the circuit of the invention provides a means of selecting an electric pulse or signal of one specific duration from pulses of various durations as applied to the input terminals of the circuit. Amongst the various advantages of this arrangement is that the circuit can be preset to select a signal of any desired duration over a wide range. The desired or selected signal operates control relays which can be used to control any equipment or operation that is susceptible to control by opening or closing electrical contacts. By the use of "timer" relays and seal-in circuit, for control relays, it is possible for the control pulse to cause the operation of the equipment to be controlled for any length of time from a few milliseconds to continuous operation.

While there has been described above a specific embodiment of the invention, it should be understood that other adaptions thereof may be made without the departure from the spirit of the invention as defined in the accompanying claims.

The invention described herein may be manufactured and used by or for the Government of the United States of America for governmental purposes without the payment of any royalties thereon or therefor.

What is claimed is:

1. A system for indicating the presence of a signal input pulse having a duration from $t_1$ seconds up to but not including $t_2$ seconds comprising the combination of a first relay means connected to be energized for the duration of an input pulse, second relay means, first and second switch means coupled respectively to said first and second relay means and actuated thereby as long as said respective relay means associated therewith are energized, means coupled between said first switch means and said second relay means for energizing said second relay means for an interval of time beginning at $t_1$ and ending at time $t_2$ after said first switch means becomes actuated, an input circuit, an output circuit, means including said first and second switch means coupling said input circuit to said output circuit only when said first switch means is unactuated and said second switch means is actuated by the respective relays associated therewith.

2. A system for indicating the presence of a signal input pulse having a duration from $t_1$ seconds up to but not including $t_2$ seconds comprising the combination of a first relay means connected to be energized for the duration of an input pulse, second relay means, first and second switch means coupled respectively to said first and second relay means actuated as long as said respective relay means associated therewith are energized, means coupled between said first switch means and said second relay means for energizing said second relay means for an interval of time beginning at $t_1$ and ending at time $t_2$ after said first switch means becomes actuated, means coupled between said first and second switch means responsive only when said first and second switch means respectively are simultaneously in an unactuated and an actuated condition thereby indicating the presence of a signal input pulse having the aforementioned duration.

3. A system for indicating the presence of a signal input pulse having a duration from $t_1$ seconds up to but not including $t_2$ seconds comprising the combination of a first relay means connected to be energized for the duration of an input pulse, said first relay means having a first and second pair of contacts, said first pair of contacts being normally closed and the said second pair of contacts being normally open, said first pair of contacts moving to open position and said second pair of contacts moving to a closed position upon actuation of said first relay means, a first source of energizing voltage, a pulse forming means having an input circuit in series circuit relation with said first source of voltage and the normally open contacts of said first relay means whereby said series circuit becomes energized upon actuation of said first relay means, said pulse forming means generating a pulse in the output thereof having a duration of $t_2-t_1$ seconds and delayed $t_1$ seconds from the moment said series circuit becomes energized, a second relay means having a first pair of normally open contacts which become closed upon actuation of said second relay means, coupling means connected between the output of said pulse forming means and said second relay means whereby said relay is actuated during the duration of the pulse output of said pulse forming means, an input circuit, an output circuit, a source of control voltage coupled to said input circuit, said input circuit coupled to said output circuit by means of a series circuit including said normally closed contacts of said first relay means and the normally open contacts of said second relay means whereby the presence of said control voltage in said output circuit is an indication of the presence of a signal pulse having the aforementioned duration.

4. A system for indicating the presence of a signal input pulse having a duration from $t_1$ seconds up to but not icluding $t_2$ seconds comprising the combination of a first relay means connected to be energized for the duration of an input pulse, said first relay means having a pair of normally open contacts which become closed upon actuation of said first relay means, a first source of energizing voltage, a pulse forming means having an input circuit in series circuit relation with said first source of voltage and the normally open contacts of said first relay means whereby said series circuit becomes energized upon actuation of said first relay means, said pulse forming means generating a pulse in the output thereof having a duration of $t_2-t_1$ seconds and delayed $t_1$ seconds from the moment said series circuit becomes energized, a second relay means, coupling means connected between the output of said pulse forming means and said second relay means whereby said relay is actuated during the duration of the pulse output of said pulse forming means, indicating means coupled to said first and second relay means operative only when said first relay means is in the unactuated condition at the same time said second relay means is in the actuated condition whereby operation of said indicating means discloses the presence of a signal pulse having the aforementioned duration.

5. A system for indicating the presence of a signal input pulse having a duration from $t_1$ seconds up to but not including $t_2$ seconds comprising the combination of a first relay means connected to be energized for the duration of an input pulse, said first relay means having a first, second and third pair of contacts, said first and second pair of contacts being normally open and said third pair of contacts being normally closed, said normally open pairs of contacts moving to a closed position and said normally closed pair of contacts moving to an open position upon actuation of said first relay means, a first source of voltage, first voltage generating means for producing in the output thereof a rising voltage waveform when a source of voltage is coupled thereto and a falling voltage waveform when said source of voltage is disconnected therefrom, second relay means coupled to the output of said first voltage generating means which becomes actuated when the voltage in the output of said first voltage generating means rises above a first given predetermined voltage level and remains actuated until said voltage has dropped below a second predetermined voltage level which is below said first predetermined voltage level, said first predetermined voltage level occurring at a time $t_1$ after said source of voltage is first coupled to said first circuit means, and said second predetermined voltage level occurring at a time $t_2-t_1$ after said voltage source is disconnected, third relay means having a first and second pair of contacts, said first pair of contacts of said third relay being normally closed and said second pair of contacts of same being normally open, said first and second pair of contacts of said third relay becoming respectively open and closed during actuation of said third relay means, said first source of voltage coupled to said first voltage generating means through a series circuit including said normally open first pair of contacts of said first relay means and said normally closed first pair of contacts of said third relay means, said second relay means having a first and second pair of normally open contacts which become closed upon actuation of said second relay means, a source of energy for actuating said third relay means, said latter source of voltage coupled to said third relay means through a series circuit including said normally open second pair of contacts of said first relay means and said normally open first pair of contacts of said second relay means, said normally open second pair of contacts of said third relay means connected in parallel circuit relation with said first pair of contacts of said second relay means, an input circuit, an output circuit, a source of control voltage coupled to said input circuit, said input circuit being coupled to said output circuit through a series circuit including the normally closed third pair of contacts of said first relay means and the normally open second pair of contacts of said second relay means whereby the presence of said control voltage in said output circuit is an indication of the presence of a signal pulse having the aforementioned duration.

THOMAS W. HOPKINSON.

REFERENCES CITED

The following references are of record in the file of this patent:

UNITED STATES PATENTS

| Number | Name | Date |
|---|---|---|
| 1,516,646 | Roseby | Nov. 25, 1924 |
| 2,062,616 | Stansbury | Dec. 1, 1936 |
| 2,083,849 | Litstrom | June 15, 1937 |
| 2,094,733 | Byrnes | Oct. 5, 1937 |
| 2,235,804 | Macalpine | Mar. 18, 1941 |
| 2,307,315 | Wolfe | Jan. 5, 1943 |
| 2,339,750 | Bartholy | Jan. 25, 1944 |
| 2,412,092 | Mayle | Dec. 3, 1946 |